United States Patent
Cao et al.

(10) Patent No.: US 9,904,520 B2
(45) Date of Patent: *Feb. 27, 2018

(54) SMART TUPLE CLASS GENERATION FOR MERGED SMART TUPLES

(71) Applicant: International Business Machines Corporation, Armonk, NY (US)

(72) Inventors: Bin Cao, Stanford, CA (US); Jessica R. Eidem, Rochester, MN (US); Brian R. Muras, Otsego, MN (US); Jingdong Sun, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 14 days.

This patent is subject to a terminal disclaimer.

(21) Appl. No.: 15/130,812

(22) Filed: Apr. 15, 2016

(65) Prior Publication Data
US 2017/0300299 A1    Oct. 19, 2017

(51) Int. Cl.
*G06F 9/44* (2006.01)
*G06F 17/30* (2006.01)

(52) U.S. Cl.
CPC .......... *G06F 8/30* (2013.01); *G06F 17/30516* (2013.01); *G06F 17/30958* (2013.01)

(58) Field of Classification Search
None
See application file for complete search history.

(56) References Cited

U.S. PATENT DOCUMENTS

| | | | |
|---|---|---|---|
| 8,935,293 B2 | 1/2015 | Park et al. | |
| 2003/0018962 A1 | 1/2003 | White et al. | |
| 2007/0226188 A1 | 9/2007 | Johnson et al. | |
| 2010/0312775 A1 | 12/2010 | Haas et al. | |
| 2013/0179394 A1 | 7/2013 | Simitsis | |
| 2013/0198489 A1 | 8/2013 | Branson et al. | |
| 2014/0122559 A1 | 5/2014 | Branson et al. | |
| 2014/0164356 A1 | 6/2014 | Branson et al. | |
| 2014/0372431 A1 | 12/2014 | Branson et al. | |
| 2014/0379712 A1 | 12/2014 | Alvarez | |
| 2016/0063389 A1* | 3/2016 | Fuchs | G06F 17/30292 706/12 |

OTHER PUBLICATIONS

Cao et al., "Smart Tuple Class Generation for Split Smart Tuples" U.S. Appl. No. 15/130,836, filed Apr. 15, 2016.
Appendix P—List of IBM Patents or Patent Applications Treated As Related, May 16, 2016, p. 1-2.
U.S. Appl. No. 14/870,041, filed Sep. 30, 2015 entitled "Smart Tuple Dynamic Grouping of Tuples".
U.S. Appl. No. 14/934,292, filed Nov. 6, 2015 entitled "Smart Tuple Dynamic Grouping of Tuples".

* cited by examiner

*Primary Examiner* — Qamrun Nahar
(74) *Attorney, Agent, or Firm* — Martin & Associates, LLC; Derek P. Martin

(57) ABSTRACT

A smart tuple manager includes a mechanism for merging a smart tuple, and for automatically generating one or more classes from existing classes when a smart tuple is merged. When a first smart tuple and a second smart tuple are merged into a new third smart tuple, a class for the third smart tuple is automatically generated from the classes for the first and second smart tuples. The class for the third smart tuple is a superset of the classes for the first and second smart tuples. After a class is automatically generated, new code segments may be added to the class as needed.

10 Claims, 4 Drawing Sheets

A{a1,a2,a3}

A{a1,a2,a3, m1(a1), m2(a2,a3)}

| Smart Tuple | Class |
|---|---|
| A | Class_A |
| B | Class_B |
| C | Class_C |
| D | Class_D |
| E | Class_E |

A{a1,a2,a3, m1(a1), m2(a2,a3)}

B{b1,b2,b3, m3(b3)}

C{a1,a2,a3, b1, b2, b3, m1(a1), m2(a2,a3), m3(b3)}

D{a1,m1(a1)}

E{a2,a3, b1, b2, b3, m2(a2,a3), m3(b3)}

SMART TUPLE CLASS GENERATION FOR MERGED SMART TUPLES

BACKGROUND

1. Technical Field

This disclosure generally relates to streaming applications, and more specifically relates to the automatic generation of classes for merged smart tuples in a streaming application.

2. Background Art

Streaming applications are known in the art, and typically include multiple operators coupled together in a flow graph that process streaming data in near real-time. An operator typically takes in streaming data in the form of data tuples, operates on the data tuples in some fashion, and outputs the processed data tuples to the next operator. Streaming applications are becoming more common due to the high performance that can be achieved from near real-time processing of streaming data.

Early streaming applications processed data tuples that included only data. More recent work has generated the concept of a "smart tuple", where a tuple can include not only data, but embedded code segments for processing the data. The advantage of a smart tuple is the tuple itself may include embedded code for processing data in the tuple. Because a smart tuple includes embedded code, the smart tuple must have a corresponding class that defines both the data and the embedded code in the smart tuple. When smart tuples are split or merged, a programmer must manually generate a class for each new type of smart tuple.

BRIEF SUMMARY

A smart tuple manager includes a mechanism for merging a smart tuple, and for automatically generating one or more classes from existing classes when a smart tuple is merged. When a first smart tuple and a second smart tuple are merged into a new third smart tuple, a class for the third smart tuple is automatically generated from the classes for the first and second smart tuples. The class for the third smart tuple is a superset of the classes for the first and second smart tuples. After a class is automatically generated, new code segments may be added to the class as needed.

The foregoing and other features and advantages will be apparent from the following more particular description, as illustrated in the accompanying drawings.

BRIEF DESCRIPTION OF THE SEVERAL VIEWS OF THE DRAWING(S)

The disclosure will be described in conjunction with the appended drawings, where like designations denote like elements, and:

DETAILED DESCRIPTION

The disclosure and claims herein are directed to a smart tuple manager that includes a mechanism for merging a smart tuple, and for automatically generating one or more classes from existing classes when a smart tuple is merged. When a first smart tuple and a second smart tuple are merged into a new third smart tuple, a class for the third smart tuple is automatically generated from the classes for the first and second smart tuples. The class for the third smart tuple is a superset of the classes for the first and second smart tuples. After a class is automatically generated, new code segments may be added to the class as needed.

Figure 1:
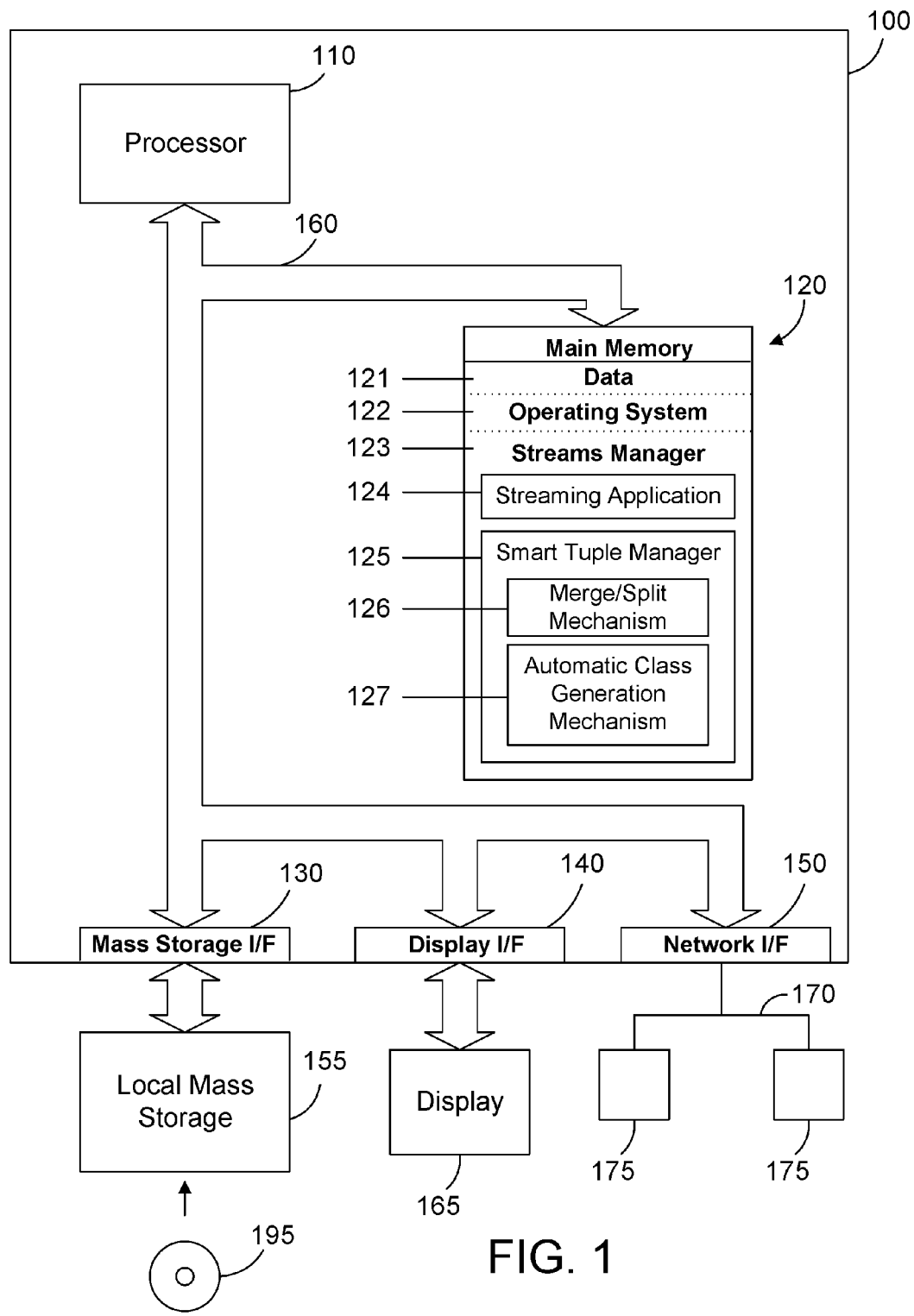
FIG. 1 is a block diagram of a computer system that includes a smart tuple manager that merges or splits smart tuples and automatically generates classes for smart tuples as needed.

Referring to FIG. 1, a computer system 100 is one suitable implementation of a server computer system that includes a smart tuple manager as described in more detail below. Server computer system 100 is an IBM POWER8 computer system. However, those skilled in the art will appreciate that the disclosure herein applies equally to any computer system, regardless of whether the computer system is a complicated multi-user computing apparatus, a single user workstation, a laptop computer system, a tablet computer, a phone, or an embedded control system. As shown in FIG. 1, computer system 100 comprises one or more processors 110, a main memory 120, a mass storage interface 130, a display interface 140, and a network interface 150. These system components are interconnected through the use of a system bus 160. Mass storage interface 130 is used to connect mass storage devices, such as local mass storage device 155, to computer system 100. One specific type of local mass storage device 155 is a readable and writable CD-RW drive, which may store data to and read data from a CD-RW 195. Another suitable type of local mass storage device 155 is a card reader that receives a removable memory card, such as an SD card, and performs reads and writes to the removable memory. Yet another suitable type of local mass storage device 155 is a thumb drive.

Main memory 120 preferably contains data 121, an operating system 122, and a streams manager 123. Data 121 represents any data that serves as input to or output from any program in computer system 100. Operating system 122 is a multitasking operating system, such as AIX or LINUX. The streams manager 123 is software that provides a runtime environment that executes a streaming application 124. The streaming application 124 comprises a flow graph that includes processing elements that include operators that process data tuples, including smart tuples. The streams manager 123 includes a smart tuple manager 125 that includes a merge/split mechanism 126 and an automatic class generation mechanism 127. The merge/split mechanism 126 determines when a merge of smart tuples or a split of a smart tuple is needed, and the automatic class generation mechanism 127 automatically generates one or more classes for the new smart tuples created by the merge/split mechanism 126, as discussed in more detail below.

Smart tuple manager 125 is shown in FIG. 1 as part of the streams manager, and is preferably a service that can merge/split smart tuples and automatically generated the needed classes, as required. However, the smart tuple manager 125 could reside elsewhere as well. For example, the smart tuple manager 125 could be part of a smart tuple. The disclosure and claims herein expressly extend to any suitable location and implementation for the smart tuple manager.

Computer system 100 utilizes well known virtual addressing mechanisms that allow the programs of computer system 100 to behave as if they only have access to a large, contiguous address space instead of access to multiple, smaller storage entities such as main memory 120 and local mass storage device 155. Therefore, while data 121, operating system 122, and streams manager 123 are shown to reside in main memory 120, those skilled in the art will recognize that these items are not necessarily all completely contained in main memory 120 at the same time. It should also be noted that the term "memory" is used herein generically to refer to the entire virtual memory of computer system 100, and may include the virtual memory of other computer systems coupled to computer system 100.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up operating system 122. Processor 110 also executes the streams manager 123, which executes the streaming application 124 and the smart tuple manager 125.

Although computer system 100 is shown to contain only a single processor and a single system bus, those skilled in the art will appreciate that a streams manager as described herein may be practiced using a computer system that has multiple processors and/or multiple buses. In addition, the interfaces that are used preferably each include separate, fully programmed microprocessors that are used to off-load compute-intensive processing from processor 110. However, those skilled in the art will appreciate that these functions may be performed using I/O adapters as well.

Display interface 140 is used to directly connect one or more displays 165 to computer system 100. These displays 165, which may be non-intelligent (i.e., dumb) terminals or fully programmable workstations, are used to provide system administrators and users the ability to communicate with computer system 100. Note, however, that while display interface 140 is provided to support communication with one or more displays 165, computer system 100 does not necessarily require a display 165, because all needed interaction with users and other processes may occur via network interface 150.

Network interface 150 is used to connect computer system 100 to other computer systems or workstations 175 via network 170. Network interface 150 broadly represents any suitable way to interconnect electronic devices, regardless of whether the network 170 comprises present-day analog and/or digital techniques or via some networking mechanism of the future. Network interface 150 preferably includes a combination of hardware and software that allows communicating on the network 170. Software in the network interface 150 preferably includes a communication manager that manages communication with other computer systems 175 via network 170 using a suitable network protocol. Many different network protocols can be used to implement a network. These protocols are specialized computer programs that allow computers to communicate across a network. TCP/IP (Transmission Control Protocol/Internet Protocol) is an example of a suitable network protocol that may be used by the communication manager within the network interface 150. In one suitable implementation, the network interface 150 is a physical Ethernet adapter.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figures 2, 3, 4, 5:
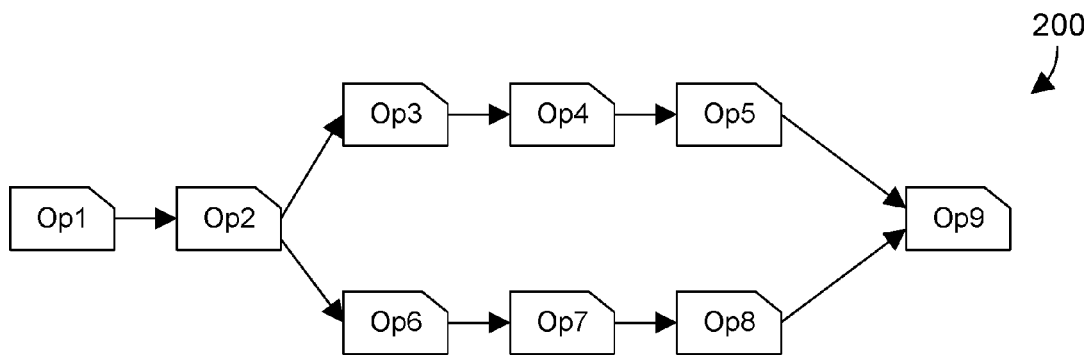
FIG. 2 is a block diagram of a sample streaming application that includes multiple operators that process data tuples, including smart tuples.
FIG. 3 shows a sample data tuple that includes only data elements.
FIG. 4 shows a sample smart tuple that includes both data elements and embedded code in the form of methods that operate on the data elements.
FIG. 5 is a table showing that for each smart tuple type, a corresponding class is required.

Referring to FIG. 2, an extremely simplified streaming application 200 is shown. The streaming application 200 includes nine operators Op1-Op9. Op1 is a source operator that produces data tuples and passes data tuples to Op2 for processing. Op2 processes the data tuples it receives from Op1 and routes some of those tuples to Op3 and others to Op4. Op3 operates on tuples it receives from Op2 and sends the resulting tuples to Op4. Op4 operates on tuples it receives from Op3 and sends the resulting tuples to Op5. Op5 operates on tuples it receives from Op4 and sends the resulting tuples to Op9. Op6 operates on tuples it receives from Op2 and sends the resulting tuples to Op7. Op7 operates on tuples it receives from Op6 and sends the resulting tuples to Op8. Op8 operates on tuples it receives from Op7 and sends the resulting tuples to Op9. Op9 receives tuples from both Op5 and Op8, and is a sink for those tuples.

Early streaming applications processed tuples that included only data, such as tuple A shown in FIG. 3. Tuple A is shown to have three data elements denoted a1, a2 and a3. More recent developments in streaming applications have recognized that a tuple can include not only data, but embedded code segments as well that allow the tuple to have intelligence for processing one or more of the data elements in the tuple. Such a tuple has been called a "smart tuple" because it contains not only data, but intelligence for processing the data as well. An example of a smart tuple A is shown in FIG. 4 to include the same data elements a1, a2 and a3 shown in FIG. 3, but additionally includes a method m1 that performs some operation on data element a1, and a method m2 that performs some operation on data elements a2 and a3. Note the operators shown in FIG. 2 could process a data-only tuple such as shown in FIG. 3 or could process a smart tuple such as shown in FIG. 4. Any or all of the operators could process smart tuples, as needed by the particular streaming application 200.

Putting embedded code into a tuple requires each type of smart tuple to have a corresponding class that defines both the data and the embedded code in the smart tuple. Thus, as shown in table 500 in FIG. 5, each smart tuple type A, B, C, D and E has a corresponding class Class_A, Class_B, Class_C, Class_D and Class_E. When a smart tuple is split into two new smart tuples, a programmer typically must manually create classes for the two new smart tuples. Similarly, when two smart tuples are merged into a new smart tuple, a programmer must manually create a class for the new smart tuple. The smart tuple manager 125 disclosed herein simplifies the process of class creation by including an automatic class generation mechanism 127 that automatically generates any needed classes for smart tuples as a result of a merge of smart tuples or a split of smart tuples. Note the automatic class generation mechanism 127 can automatically generate classes that are used at run-time. In addition, the automatic class generation mechanism 127 can generate classes in an integrated development environment that could then be presented to a programmer for review and approval. Thus, the automatic class generation mechanism 127 can generate both source code and executable object code, as needed.

Figures 6, 7, 8:
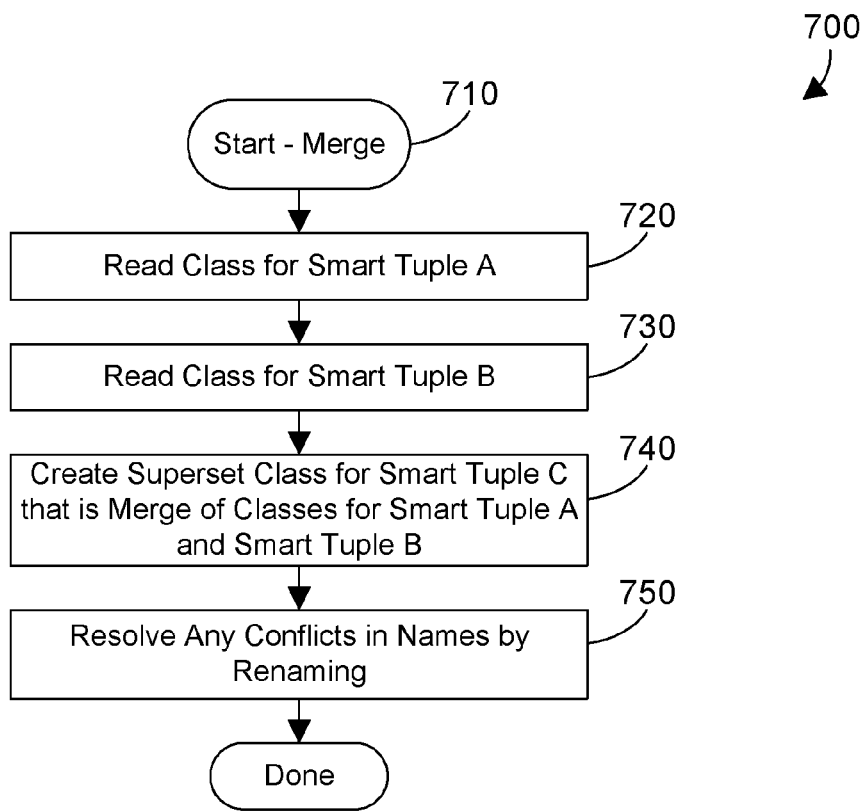
FIG. 6 shows two smart tuples A and B that can be merged by the smart tuple manager in the streams manager.
FIG. 7 is a flow diagram of a method for merging smart tuples and automatically generating a class for the resulting merged smart tuple.
FIG. 8 shows a smart tuple C created by merging the smart tuples A and B in FIG. 6 using method 700 shown in FIG. 7.

FIG. 6 shows two smart tuples A and B, with smart tuple A including data elements a1, a2 and a3, and a method m1 that operates on data element a1 and a method m2 that operates on data elements a2 and a3. Smart tuple B includes data elements b1, b2 and b3, and a method m3 that operates on data element b3.

FIG. 7 shows a method 700 that is preferably performed by the automatic class generation mechanism 127 in FIG. 1. Method 700 begins when two smart tuples need to be merged (step 710), as determined by the merge/split mechanism 126 in FIG. 1. The classes for the smart tuples to be merged are read (steps 720 and 730). In this specific example, we assume the two smart tuples A and B shown in FIG. 6 need to be merged. This means the class corresponding to smart tuple A is read in step 720, and the class corresponding to smart tuple B is read in step 730. Next, a superset class is created for the resulting merged smart tuple C, where the superset class is a merge of the classes for smart tuple A and smart tuple B (step 740). If the merge creates any conflicts in names of data elements or methods, the conflicts are resolved by renaming one or both of the data elements or methods that have the same name (step 750). Method 700 is then done. The resulting smart tuple C is shown in FIG. 8, and the corresponding class for the merged tuple C will include all data elements a1, a2, a3, b1, b2, b3 m1, m2 and m3 to correspond to the superset of data elements and methods shown in FIG. 8 for the two original smart tuples A and B shown in FIG. 6. While the specific example in FIGS. 6-8 shows steps for merging two smart tuples, one skilled in the art will realize that a similar method could be used to merge three or more smart tuples.

Figures 9, 10:
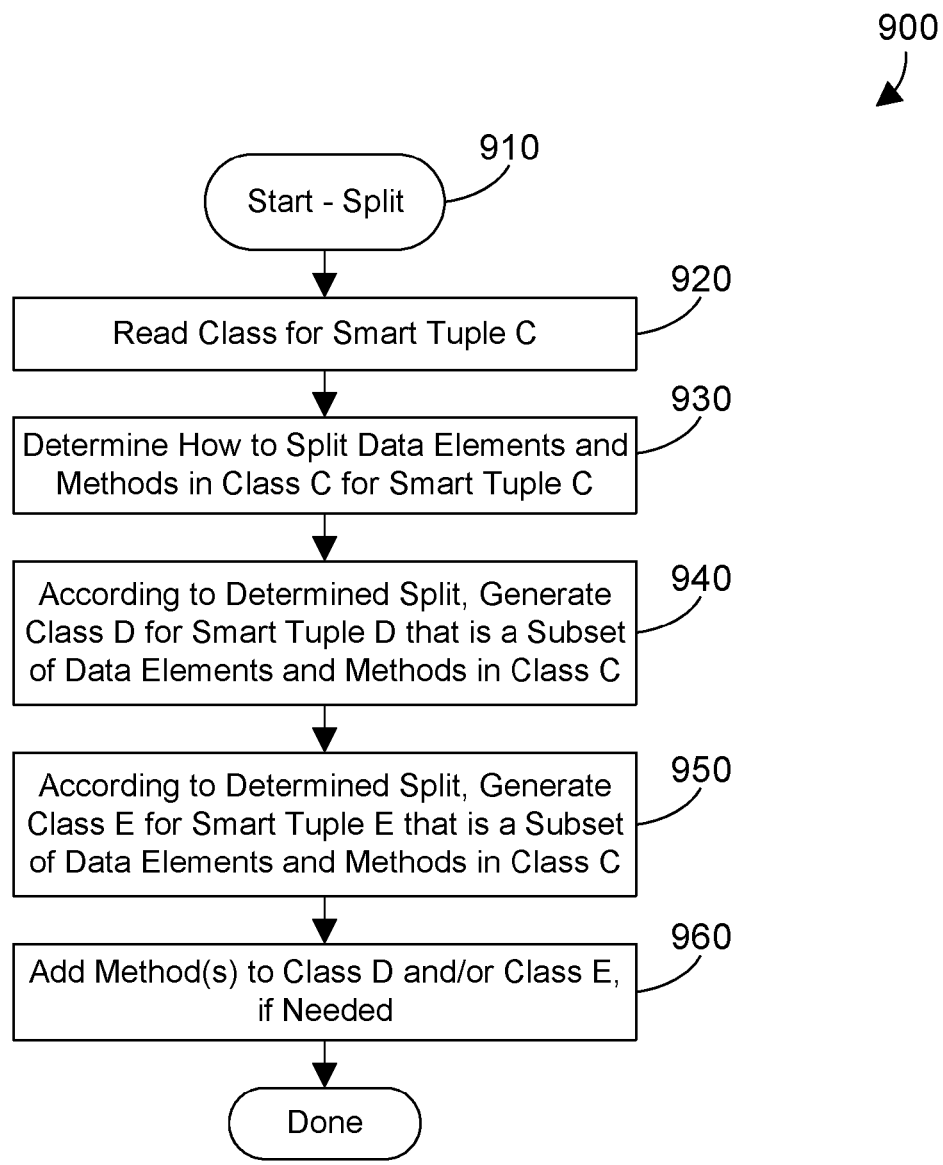
FIG. 9 is a flow diagram of a method for splitting a smart tuple into multiple new smart tuples and for automatically generating classes for the new smart tuples.
FIG. 10 shows smart tuples D and E created by splitting the smart tuple C in FIG. 8.

FIG. 9 shows a method 900 that is preferably performed by the automatic class generation mechanism 127 in FIG. 1. Method 900 begins when a smart tuple needs to be split into two or more smart tuples (step 910). The class for the smart tuple to be split is read (step 920). A determination is made regarding how to split the data elements and methods in class C for the smart tuple C (step 930). For example, downstream operators on each side of the split could be analyzed to determine what attributes and/or methods they require. According to the determined split, a class D is automatically generated for a smart tuple D that is a subset of data elements and methods in class C (step 940). According to the determined split, a class E is automatically generated for a smart tuple E that is a subset of data elements and methods in class C (step 950). One or more methods could be added to class D and/or class E, if needed (step 960). For example, let's assume the determined split results in a first tuple with only data elements and a second tuple that is a smart tuple with both data elements and embedded code. One or more methods could be added to either or both of these tuples in step 960, as needed. While the specific example in FIGS. 8-10 shows steps for splitting a smart tuple into two smart tuples, one skilled in the art will realize that a similar method could be used to split a smart tuple into three or more smart tuples.

Let's assume the tuple C in FIG. 8 that was created by merging tuples A and B in FIG. 6 now needs to be split. Using method 900 in FIG. 9, two new smart tuples D and E can be created as shown in FIG. 10, and their corresponding classes can also be automatically generated that define their respective data elements and methods. Thus, for smart tuple D in FIG. 10, a class D could be created that defines data element a1 and method m1 that operates on data element a1. Similarly, for smart tuple E in FIG. 10, a class E could be created that defines data element a2, a3, b1, b2, b3, and method m2 that operates on data elements a2 and a3 and method m3 that operates on data element b3.

While code is not shown for the classes herein, a programmer of ordinary skill in the art will readily understand how the classes herein are automatically generated based on the data elements and the methods in the smart tuples being merged or split. The automatic class generation mechanism 127 disclosed herein can generate both the source code of the new class and the runtime code to support the new class.

A smart tuple manager includes a mechanism for merging a smart tuple, and for automatically generating one or more classes from existing classes when a smart tuple is merged. When a first smart tuple and a second smart tuple are merged into a new third smart tuple, a class for the third smart tuple is automatically generated from the classes for the first and second smart tuples. The class for the third smart tuple is a superset of the classes for the first and second smart tuples. After a class is automatically generated, new code segments may be added to the class as needed.

One skilled in the art will appreciate that many variations are possible within the scope of the claims. Thus, while the disclosure is particularly shown and described above, it will be understood by those skilled in the art that these and other changes in form and details may be made therein without departing from the spirit and scope of the claims.

The invention claimed is:

1. An apparatus comprising:
    at least one processor;
    a memory coupled to the at least one processor; and
    a streams manager residing in the memory and executed by the at least one processor, the streams manager executing a streaming application comprising a flow graph that includes a plurality of operators that process a plurality of smart data tuples, each smart data tuple comprising:
        a plurality of data elements; and
        at least one embedded software code segment that, when executed, performs an operation on at least one of the plurality of data elements;
    wherein the streaming application comprises a plurality of classes that each defines the plurality of data elements and the at least one embedded software code segment for each type of smart tuple; and
    wherein the streams manager determines when a merge of a first smart tuple with a second smart tuple into a third smart tuple is needed, and in response, automatically generates a class for the third smart tuple from the classes corresponding to the first and second smart tuples.

2. The apparatus of claim 1 wherein the class for the third smart tuple comprises a superset of data elements and embedded software code segments that exist in the classes corresponding to the first and second smart tuples.

3. The apparatus of claim 1 wherein the streams manager adds at least one embedded software code segment to the class for the third smart tuple.

4. The apparatus of claim 1 wherein when a first data element in the first smart tuple has a same name as a second data element in the second smart tuple, renaming at least one of the first and second data elements.

5. A computer-implemented method executed by at least one processor for executing streaming applications, the method comprising:
    executing a streaming application comprising a flow graph that includes a plurality of operators that process a plurality of smart data tuples, each smart data tuple comprising:

a plurality of data elements; and
at least one embedded software code segment that, when executed, performs an operation on at least one of the plurality of data elements;
wherein the streaming application comprises a plurality of classes that each defines the plurality of data elements and the at least one embedded software code segment for each type of smart tuple; and
determining when a merge of a first smart tuple with a second smart tuple into a third smart tuple is needed, and in response, automatically generates a class for the third smart tuple from the classes corresponding to the first and second smart tuples.

6. The method of claim 5 wherein the class for the third smart tuple comprises a superset of data elements and embedded software code segments that exist in the classes corresponding to the first and second smart tuples.

7. The method of claim 5 further comprising adding at least one embedded software code segment to the class for first smart tuple.

8. The method of claim 5 wherein when a first data element in the first smart tuple has a same name as a second data element in the second smart tuple, renaming at least one of the first and second data elements.

9. A computer-implemented method executed by at least one processor for executing streaming applications, the method comprising:
  executing a streaming application comprising a flow graph that includes a plurality of operators that process a plurality of smart data tuples, each smart data tuple comprising:
    a plurality of data elements; and
    at least one embedded software code segment that, when executed, performs an operation on at least one of the plurality of data elements;
  wherein the streaming application comprises a plurality of classes that each defines the plurality of data elements and the at least one embedded software code segment for each type of smart tuple;
  determining when a merge of a first smart tuple with a second smart tuple into a third smart tuple is needed, and in response, automatically generating a class for the third smart tuple from the classes corresponding to the first and second smart tuples, wherein the class for the third smart tuple comprises a superset of data elements and embedded software code segments that exist in the classes corresponding to the first and second smart tuples, wherein when a first data element in the first smart tuple has a same name as a second data element in the second smart tuple, renaming at least one of the first and second data elements;
  determining when a split of a fourth smart tuple is needed into fifth and sixth smart tuples, and in response, automatically generating classes for the fifth and sixth smart tuples from a class corresponding to the fourth smart tuple, wherein the classes for the fifth and sixth smart tuples each comprise a subset of data elements and embedded software code segments that exist in the class corresponding to the fourth smart tuple; and
  adding at least one embedded software code segment to the class for the third smart tuple.

10. The method of claim 9 further comprising:
  adding at least one embedded software code segment to the class for the fifth smart tuple; and
  adding at least one embedded software code segment to the class for the sixth smart tuple.

\* \* \* \* \*